United States Patent

Minoura

[11] 4,215,912
[45] Aug. 5, 1980

[54] HIGH SPEED SCANNING DEVICE FOR SCANNING THE SAME AREA PLURAL TIMES BY A BEAM DEFLECTED BY A SINGLE DEFLECTING SURFACE

[75] Inventor: Kazuo Minoura, Yokohama, Japan
[73] Assignee: Canon Kabushiki Kaisha, Tokyo, Japan
[21] Appl. No.: 902,957
[22] Filed: May 4, 1978
[30] Foreign Application Priority Data
  May 17, 1977 [JP] Japan ................. 52-56940
[51] Int. Cl.² .............................. G02B 27/17
[52] U.S. Cl. ................... 350/6.8; 350/6.91
[58] Field of Search ............ 350/6.5, 6.91, 6.1; 358/206, 208; 352/107, 108; 340/146.3 F

[56] References Cited
U.S. PATENT DOCUMENTS

3,728,677  4/1973  Munson ............... 340/146.3 F
3,972,583  8/1976  Lobb .................... 350/6.8

FOREIGN PATENT DOCUMENTS

487318  6/1938  United Kingdom ............ 350/6.8

*Primary Examiner*—Jon W. Henry
*Attorney, Agent, or Firm*—Fitzpatrick, Cella, Harper & Scinto

[57] ABSTRACT

A scanning optical system with an improved scanning efficiency wherein a deflection space swept by a beam deflected by a deflecting surface of a deflecting device is divided into plural spatial zones, each of said divided spatial zones is provided with a transmission optical system for guiding the beam passing through each spatial zone to a scanned surface, and the beam scans said surface after passing through said transmission optical system is adapted to scan a same scan area whereby said same scan area is scanned plural times by the beam deflected by a single deflecting surface.

7 Claims, 6 Drawing Figures

HIGH SPEED SCANNING DEVICE FOR SCANNING THE SAME AREA PLURAL TIMES BY A BEAM DEFLECTED BY A SINGLE DEFLECTING SURFACE

BACKGROUND OF THE INVENTION

The present invention relates to a scanning optical system with an improved scanning efficiency.

For achieving a high-speed scanning the use of a polygonal mirror as a deflector or scanning device is commonly known. Such polygonal mirror, of an elevated precision, becomes more difficult to manufacture and requires a high manufacturing cost as the number of reflecting surfaces increases. On the other hand a polygonal mirror of a fewer number of reflecting surfaces for reducing said difficulties will result in a scanning function with an inferior scanning efficiency. For example, in a deflector with four deflecting surfaces such as a tetragonal mirror, each surface is capable of deflecting a stationary incident beam over 180°. However, the scanning lens provided between the deflector and the scanned surface is usually capable of covering a half-angle of only 20°-30°. Thus, even if the beam is deflected over 180°, the deflected beam can only partly contribute to the scanning, leading to a small proportion of effective scanning time and therefore a low scanning efficiency.

SUMMARY OF THE INVENTION

The object of the present invention is to provide an improvement over the above-mentioned system and to provide a scanning optical system capable of achieving an improved scanning efficiency even with a deflector with fewer deflecting surfaces.

In the scanning optical system of the present invention an improvement in the scanning efficiency is achieved in that the same scan area is scanned plural times by a beam deflected by a single deflecting surface, in contrast to the conventional system wherein a scan area can be scanned only once by the beam deflected by a single deflection surface.

More specifically the present invention is featured in that a deflection space swept by a beam deflected by a deflecting surface of a deflector is divided into a plural spatial zones, and that each of said divided spatial zones is provided with a transmission optical system for guiding said deflected beam passing through said spatial zone to the scan area. Stated differently, according to the present invention, the light flux formed by all the beams deflected by a deflecting surface of a deflector, hereinafter referred to as deflected light flux, is spatially divided by means of transmission optical systems, and thus divided partial light fluxes are guided to the scan area by said transmission optical systems through different optical paths to achieve scanning of the same area. Consequently the number of scannings on said same area by the deflection of a deflecting surface is equal to the number of divisions of said deflected light flux.

In an embodiment of the present invention to be described later, there is shown as a deflector a rotary polygonal mirror provided with a plurality of reflecting surfaces, and the beam deflected by a first reflecting surface of said rotary polygonal mirror is, upon passing through said transmission optical system, again deflected by a second reflecting surface of said rotary polygonal mirror different from said first reflecting surface to perform scanning of a scan area. In case of guiding the beam deflected by said first reflecting surface to said second reflecting surface through said transmission optical system, the beams (partial light fluxes) belonging to different spatial zones may be guided to the second reflecting surface through the same transmission optical system but always through different paths.

In the scanning optical system of the present invention and in case said deflector is a rotary polygonal mirror provided with three or more reflecting surfaces, the number of said transmission optical systems is equal to the number of said divided spatial zones, and the beam does not pass through said transmission optical system twice or more during deflection by a reflecting surface.

On the other hand in case said deflector is a mirror with two surfaces namely a parallel-surfaced mirror, the number of said transmission optical systems does not necessarily coincide with the number of said divided spatial zones or of said partial light fluxes. Namely in such case it is possible to arrange the deflector and the transmission optical systems in such a manner that the deflected beam passes through the same transmission optical system twice during deflection by a reflecting surface. Also such parallel-surfaced mirror may be utilized either in a rotating state at a constant speed in one direction or in a vibrating state similar to a galvano-mirror.

Furthermore in the scanning optical system of the present invention, it is possible to limit the dimension of said deflector by employing an afocal optical system as said transmission optical system.

Furthermore in the scanning optical system of the present invention, it is possible to obtain a deflection angle larger than the deflection angle obtainable merely by the rotation angle of the deflector, by rendering the direction of deflection of the beam introduced to the second reflecting surface after passing through said transmission optical system opposite to the direction of rotation of the deflector. Consequently it is possible, by means of said amplifying effect of the deflection angle, to prevent the decrease of deflection angle of final beam in case of an increased number of spatial divisions or in case of an improved scanning efficiency achieved by the use of the above-mentioned spatial division in combination with a deflector provided with a large number of reflecting surfaces.

DESCRIPTION OF THE PREFERRED EMBODIMENTS

Figure 1:
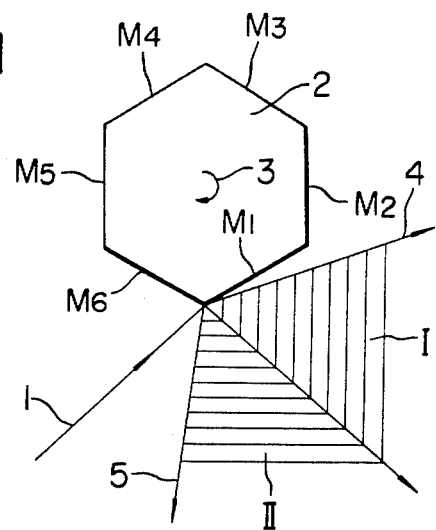
FIG. 1 is a drawing explaining the basic principles of improving the scanning efficiency in the scanning efficiency in the scanning optical system of the present invention.

Referring to FIG. 1 illustrating the basic principle of improving the scanning efficiency in the scanning optical system of the present invention, a stationary incident beam 1 for scanning is directed to a rotary hexagonal mirror 2 functioning as a deflector with six reflecting surfaces M1-M6 and rotated in the direction of arrow 3. The hatched area indicates a space of deflection by a reflecting surface of said rotary hexagonal mirror 2, namely the aforementioned deflection space, which is formed by the entire deflected beams. If a deflected beam is considered as a ray of light in the sense of geometrical optics, the above-mentioned deflection space is essentially identical to the deflected light flux. The beam 1 is deflected in the hatched area from a direction 4 to a direction 5 according to the rotation of said rotary hexagonal mirror. In case of a hexagonal rotary reflector as shown in FIG. 1, the hatched area, or the space occupied by the entire deflected beams deflected by a single reflecting surface has an angle of 120°. However, even if the beam is deflected over such a large angle, it is not possible to utilize all the deflected beams in relation with the angle of the scanning lens. According to the present invention an effective utilization of the deflected beam is achieved by dividing the deflection space covered by the beam deflected by a reflecting surface into plural zones and rendering the beams passing through different divided zones to scan the same scan area whereby the scan area is scanned twice or more by the beam deflected by a single reflecting surface. For example, in case of FIG. 1, the deflection space is divided into a spatial zone (partial light flux) I and a spatial zone (partial light flux) II whereby the scan area is subjected to one scanning while the deflected beam passes through the deflection spatial zone I and again subjected to another scanning while the deflected beam passes through the spatial zone II. In order to enable the beam deflected into different spatial zones to scan a same scan area, there are provided transmission optical systems for guiding said deflected beam.

Figure 2:
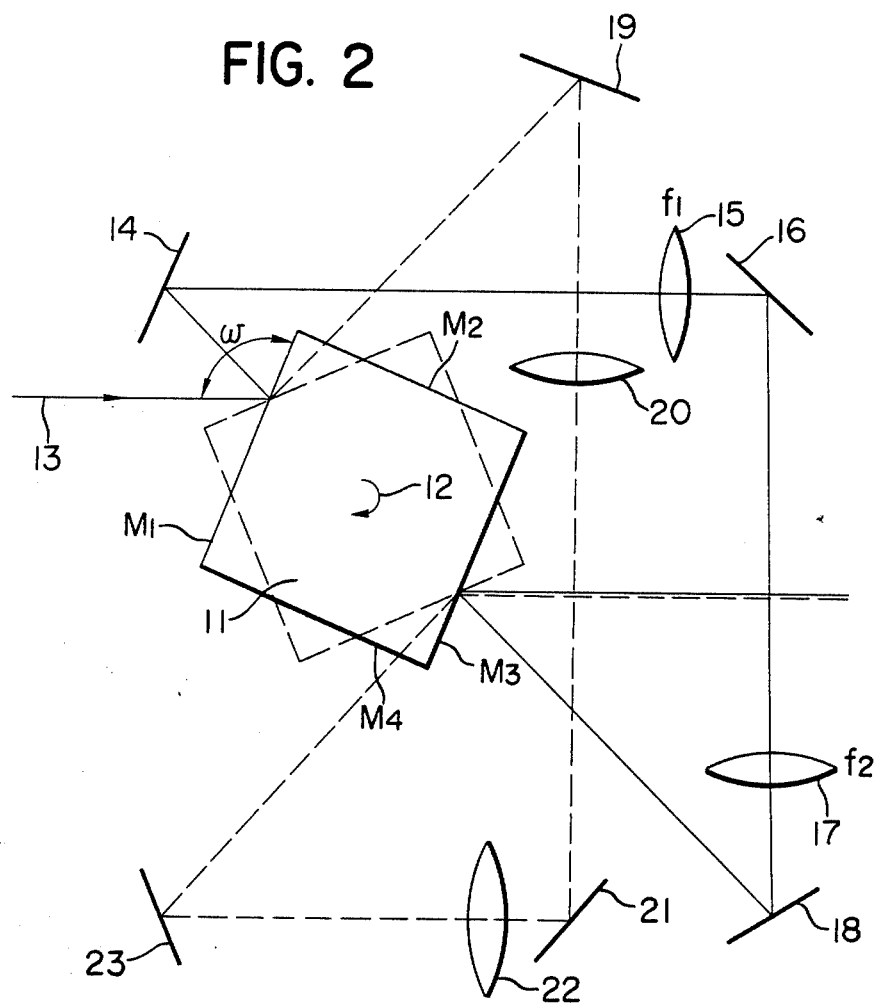
FIGS. 2, 3, 4 and 5 are the drawings respectively showing the embodiments of the scanning optical system of the present invention.

FIG. 2 shows an embodiment of the scanning optical system of the present invention employing a rotary tetragonal mirror as the deflector wherein the deflection space is divided into two zones and there are provided two transmission optical systems. In FIG. 2 11 is a rotary tetragonal mirror provided with reflecting surfaces M1, M2 M3 and M4, the broken line indicating the position of said mirror rotated by 45° in the direction of arrow 12 from the position thereof indicated by the full line. 13 is a stationary scanning beam which enters said mirror with an angle $\omega$ in the full-lined position thereof and with an angle $\omega + 45°$ in the broken-lined position thereof. The beam entering the surface M1 with the angle $\omega$ then passes through a reflecting mirror 14, a first relay lens 15, a reflecting mirror 16, a second relay lens 17 and a reflecting mirror 18; which constitute a first transmission optical system, and is again deflected by the reflecting surface M3 to perform scanning on a scan surface (not shown). On the other hand, the beam entering the surface M1 with the angle $\omega + 45°$ then passes through a second transmission optical system consisting of a reflecting mirror 19, a third relay lens 20, a reflecting mirror 21, a fourth relay lens 22 and a reflecting mirror 23, and is again deflected by the reflecting surface M3 to be directed toward said scan surface. As shown in FIG. 2, the beam entering the reflecting surface M1 with an angle $\omega$ or $\omega + 45°$ respectively passes through the optical axis of said first or second transmission optical system and thus constitutes the standard beam for each transmission optical system. Thus, in case the reflecting surface M1 is located within an angular range of $\pm \Delta\omega$ with respect to the full-lined position, the beam reflected by said reflecting surface M1, after passing through the first transmission optical system, is again reflected by the surface M3 to complete one scanning. Also in case the reflecting surface M1 is further rotated and located within an angular range of $\pm \Delta\omega$ with respect to the broken-lined position, the beam reflected by said reflecting surface M1, after passing through said second transmission optical system, is again reflected by the reflecting surface M3 to complete one scanning. Said angular range of $\pm \Delta\omega$ is adjustable by the transmission optical system. In the scanning optical system shown in FIG. 2, in case said first and second transmission optical systems are both afocal and the number of mirrors contained in each transmission optical system is odd, there is obtained no particular amplification in the deflection angle of the final beam obtained after passing through the transmission optical system and redeflection by the rotary tetragonal mirror. However in case the number of mirrors in the transmission optical system is even, and regardless whether said optical system is afocal or not, the direction of deflection of beam entering the reflecting surface of the tetragonal mirror after passing through the transmission optical system is opposite to the direction of rotation of said mirror 11, and there is therefore obtained an amplification in the deflecting angle of the final scanning beam. In such case the degree of amplification is adjustable by regulating the focal length of the relay lenses provided in the transmission optical system.

Figure 3:
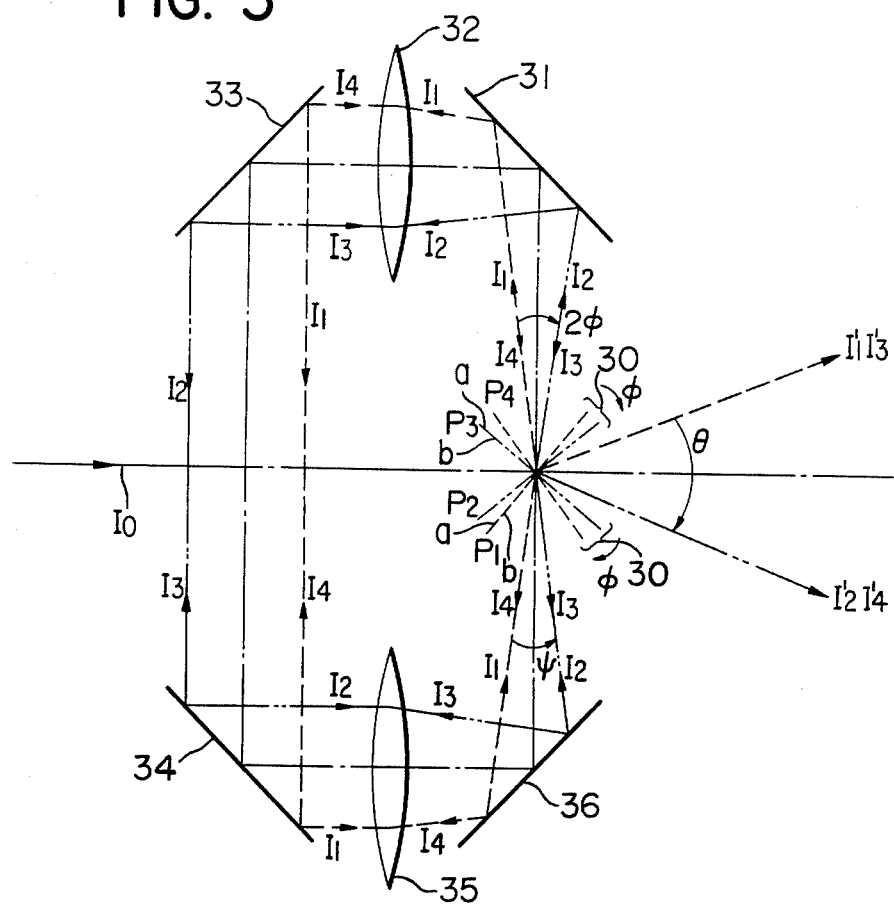

FIG. 3 shows an another embodiment of the scanning optical system of the present invention wherein the deflector is composed of a parallel-surfaced rotary mirror provided with two reflecting surfaces and there is provided only one transmission optical system despite the division of deflection space into two zones. Said mirror 30 changes the position thereof in time in the order of P1, P2, P3 and P4. A stationary scanning beam IO entering said mirror 30 in the position P1 is reflected by a first reflecting surface a to form a beam I1, which passes through a transmission optical system consisting of a mirror 31, a first relay lens 32, a mirror 33, a mirror 34, a second relay lens 35 and a mirror 36 and is again reflected by a second reflecting surface b of said rotary mirror 30 to form a beam I1'. Upon rotation of said rotary mirror 30 by an angle $\phi$ to reach the position P2, the incident beam IO is reflected by said first reflecting surface a to form a beam I2 which passes said transmission optical system from the mirror 31 to the mirror 36 in the same normal direction as the beam I1 and is again reflected by said second reflecting surface b of the rotary mirror 30 to form a beam I2' which forms a scanning angle of $\theta$ with the above-mentioned beam I1'. Upon further rotation of the rotary mirror to the position P3, the incident beam IO is at first reflected by the second reflecting surface b of said mirror to form a beam I3, which passes through said transmission optical system in an opposite direction to the aforementioned beam I1 or I2, namely in the order of the mirror 36, second relay lens 35, mirror 34, mirror 33, first relay lens 32 and mirror 31 and is again reflected by the first reflecting surface a of said rotary mirror 30 to form a beam I3' of which position is identical to that of the above-mentioned beam I1'. Upon further rotation of the rotary mirror by an angle $\phi$ to the position P4, the incident beam IO is reflected by the second reflecting surface b of said mirror 30 to form a beam I4, which passes through the transmission optical system in the same direction as the above-mentioned beam I3 and is again reflected by the first reflecting surface a of the mirror 30 to form a beam I4' of which position is identical to that of the above-mentioned beam I2'. In this manner two scannings in the same scan area are performed during a rotation of parallel-surfaced mirror by 180°, or four scannings in the same scan area performed during a full turn of said mirror.

In the optical system shown in FIG. 3, the direction of deflection reentering the mirror 30 after passing through the transmission optical system is opposite to the direction of rotation of said mirror. From this reason, in the scanning optical system of the present invention, it is possible to obtain a deflection angle (scanning angle) $\theta$ far larger than the angle of rotation $\phi$ of the scanning mirror. The ratio of amplification of the final deflection angle $\theta$ with respect to said angle of rotation $\phi$ can be arbitrarily selected by the arrangement of the transmission optical system, particularly by the power arrangement of the relay lenses 32, 35.

Furthermore, in place of the parallel-surfaced rotary mirror described above, there may be employed a parallel-surfaced vibrating mirror such as a galvanomirror. In such case if the mirror is moved in the order of P1, P2, P3 and P4 and then reversed in the order of P4, P3, P2 and P1 to complete a cycle, the scannings of I1' to I2', I3' to I4', I4' to I3' and I2' to I1' are respectively performed by the mirror rotations from P1 to P2, P3 to P4, P4 to P3 and P2 to P1.

Thus, in case a vibrating mirror is employed as the scanning mirror, the direction of deflection of the final beam is reversed at determined intervals.

Figure 4:
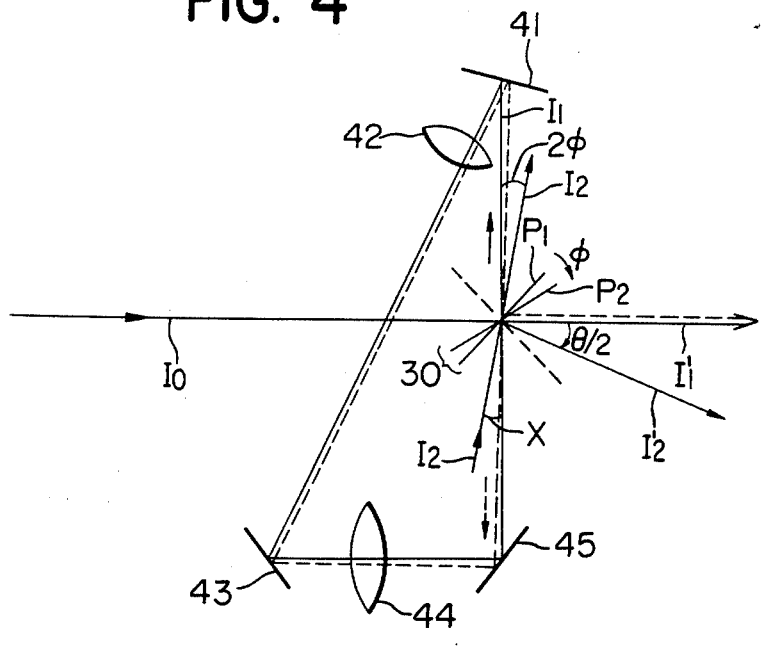

FIG. 4 shows a still another embodiment of the scanning optical system of the present invention which is basically same as the optical system shown in FIG. 3 but shows no amplification of the deflection angle since the transmission optical system contains an odd number of mirrors. In FIG. 4, the transmission optical system is composed of a mirror 41, a first relay lens 42, a mirror 43, a second relay lens 44 and a mirror 45 wherein the front focal point of said first relay lens is located on one surface of a parallel-surfaced mirror 30 while the rear focal point of said second relay lens 44 is located on the other surface of said rotary mirror 30. Said transmission optical system constitutes an afocal optical system as the rear focal point of said first relay lens 42 does not coincide with the front focal point of said second relay lens 44. Supposing that the focal lengths of the lenses 42 and 44 are f1 and f2 respectively and f1 < f2, and upon rotation of the rotary mirror 30 by an angle $\phi$ to the position P2, the incident beam I0 is reflected by the first reflecting surface a to form a beam I2, which, after passing through said transmission optical system, is guided to the second reflecting surface b with an angle $0 < x < 2\phi$ with respect to the aforementioned beam L1. In this case the beam I2 is deflected in a same direction as the rotary mirror with respect to said beam I1 and constitutes, after passing through the transmission optical system, an angle, with respect to said beam I1, in the same direction as the angle of rotation of the mirror. Thus the beam I2' reflected by the second reflecting surface b forms, with respect to said beam I1', an angle smaller than $2\phi$, thus resulting in no amplification in the deflection angle.

Figure 5:
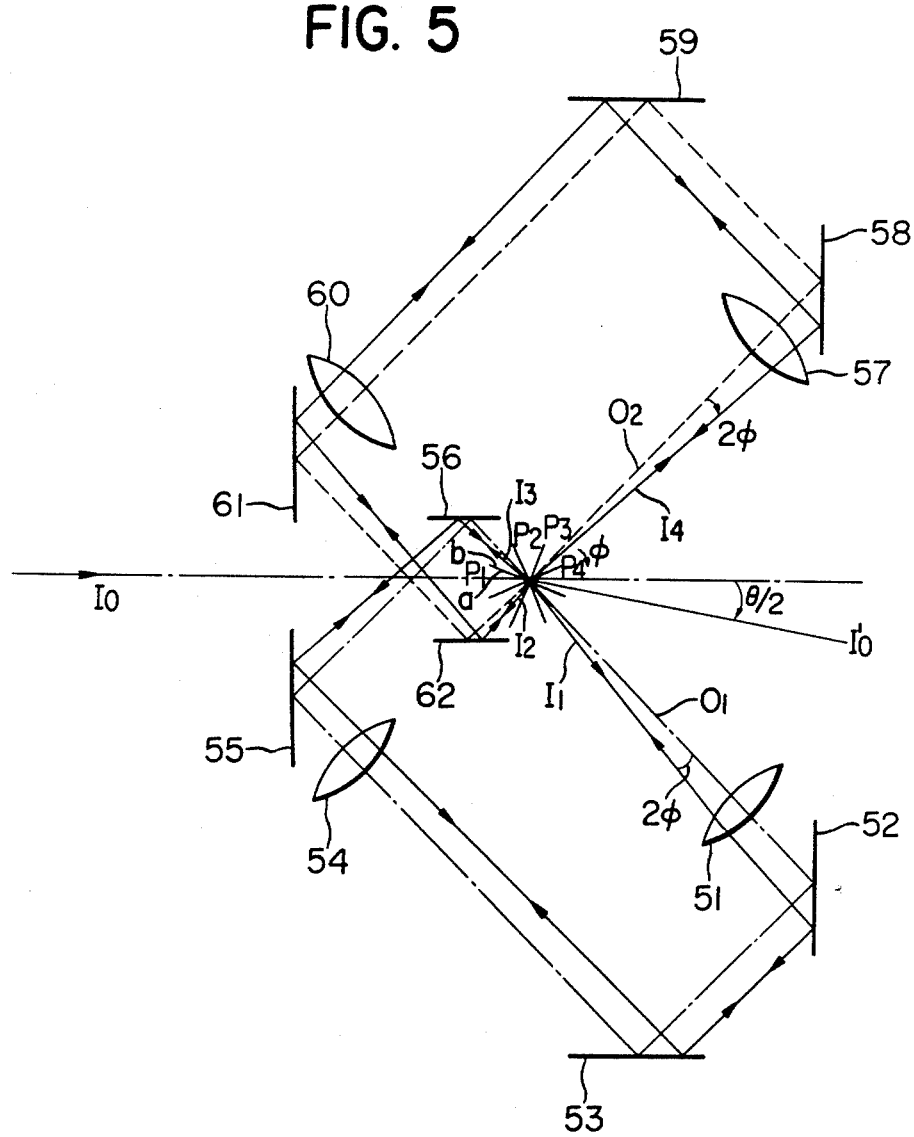

FIG. 5 shows a still another embodiment of the scanning optical system of the present invention, wherein a parallel-surfaced rotary mirror as the deflector and the deflection space of the scanning beam from a single reflecting surface is divided into four spatial zones. The optical system shown in FIG. 5 is an embodiment provided with two transmission optical systems shown in FIG. 4, wherein a first transmission optical system is composed of a first relay lens 51, a mirror 52, a mirror 53, a second relay lens 54, mirror 55 and mirror 56 while a second transmission optical system is composed of a third relay lens 57, a mirror 58, a mirror 59, a fourth relay lens 60, a mirror 61 and a mirror 62. Said first and second transmission optical systems are provided with identical optical characteristics and are symmetrically arranged with respect to the incident beam I0. Also said optical systems are both afocal. The chain line 01 and the broken line 02 respectively indicate the optical axes of said first and second transmission optical systems.

When the rotary mirror is in a position P1, the incident beam I0 is reflected by a first reflecting surface a to form a beam I1 which passes through said first transmission optical system in a direction from said first relay lens 51 to said mirror 56 and is again reflected by the second reflecting surface b of said rotary mirror to form a beam I0' directed to the scan area.

When the rotary mirror is in a position P2, the incident beam I0 is reflected by the first reflecting surface a to form a beam I2 which passes through said second transmission optical system in a direction from said mirror 62 to said third relay lens 57 and is again reflected by the second reflecting surface b of said rotary mirror to form a beam I0' directed to the scan area.

When the rotary mirror is in a position P3, the incident beam I0 is reflected by the first reflecting surface a to form beam I3 which passes through said first transmission optical system in a direction from the mirror 56 to said first relay lens 51 and is again reflected by the second reflecting surface b of the rotary mirror to form a beam I0' directed to the scan area.

When the rotary mirror is in a position P4, the incident beam I0 is reflected by the first reflecting surface a to form a beam I4 which passes through said second transmission optical system in a direction from the third relay lens 57 to the mirror 62 and is again reflected by the second reflecting surface b to form a beam I0' directed to the scan area.

The final deflection angle $\theta/2$ is amplified as the direction of deflection of the beam reentering the rotary mirror after passing through said first or second transmission optical system is opposite to the direction of rotation of said mirror.

In the embodiment shown in FIG. 5 a same area is four times scanned during the rotation of parallel-surfaced rotary mirror by an angle of 180°, or eight scannings during the full turn of the rotary mirror, thus enabling to achieve an effect same as that obtained with rotary octagonal mirror.

In the transmission optical system shown in FIG. 3, 4 or 5, two beams belonging to different spatial zones pass through said optical system during the scanning with a single deflecting surface, but said beams assume opposite and different paths.

Figure 6:
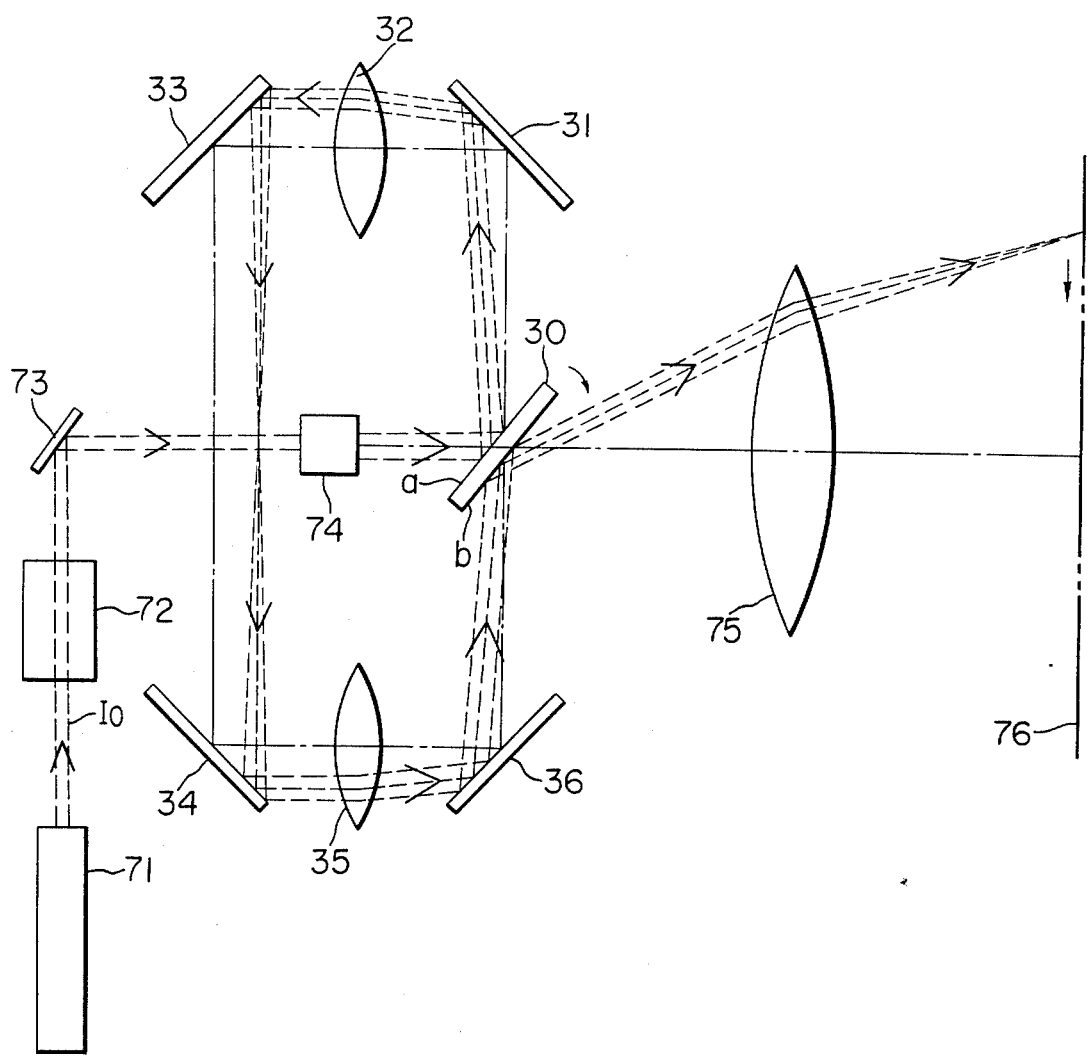
FIG. 6 is a drawing of an embodiment of an information recording apparatus incorporating the scanning optical system of the present invention.

FIG. 6 shows an embodiment of a high-speed recording apparatus incorporating the scanning optical system of the present invention shown in FIG. 3, wherein a beam I0 from a laser generator 71 is information modulated by a light modulator 72 and enters, through a mirror 73 and a beam expander 74, a first reflecting surface a of a parallel-surfaced rotary mirror. The reflected beam passes through the above-mentioned transmission optical system (31, 32, 33, 34, 35 and 36) and is again deflected by a second reflecting surface b of said rotary mirror to form a beam I0', which is focused on a recording surface 76 by means of a scanning imaging lens 75. Since said beam 10′ deflected by said second reflecting surface is deflected with a constant angular velocity, a constant speed recording can be achieved on said recording surface 76 by employing an already known f−θ lens for said imaging lens 75.

What I claim is :

1. A scanning optical system comprising:
   a light source;
   a deflector provided with at least two deflecting surfaces and adapted to deflect the light beam from said light source to a predetermined direction; and
   a transmission optical system, which permits scanning of the same scan area plural times by a beam deflected by a single deflecting surface of said deflector, including means for spatially dividing the deflected light flux deflected by a first deflecting surface of said deflector into plural partial light fluxes and means for guiding the thus divided partial light fluxes through said transmission optical system to a second deflecting surface of said deflector to perform scanning of said scan area.

2. A scanning optical system according to the claim 1 wherein said deflector is a rotary polygonal mirror, and the number of said transmission optical systems is equal to the number of said partial light fluxes.

3. A scanning optical system according to the claim 2 wherein said transmission optical system is an afocal optical system consisting of plural mirrors and lenses.

4. A scanning optical system according to the claim 3 wherein the direction of deflection of the beam entering said second deflecting surface is opposite to the direction of rotation of said deflector.

5. A scanning optical system according to the claim 1 wherein said deflector is a parallel-surfaced planar mirror with two deflecting surfaces, and two different partial light fluxes among said plural partial light fluxes are guided to said second deflecting surface through said transmission optical system.

6. A scanning optical system according to the claim 5 wherein said transmission optical system is an afocal optical system consisting of plural mirrors and lenses.

7. A scanning optical system according to the claim 6 wherein the direction of deflection of the beam entering said second deflecting surface is opposite to the direction of rotation of said deflector.

* * * * *

UNITED STATES PATENT AND TRADEMARK OFFICE
CERTIFICATE OF CORRECTION

PATENT NO. : 4,215,912
DATED : August 5, 1980
INVENTOR(S) : KAZUO MINOURA

It is certified that error appears in the above-identified patent and that said Letters Patent are hereby corrected as shown below:

Column 2, line 52, delete "effi-";

line 53, delete "ciency in the scanning".

Signed and Sealed this

Twenty-fifth Day of November 1980

[SEAL]

Attest:

SIDNEY A. DIAMOND

Attesting Officer

Commissioner of Patents and Trademarks